United States Patent
Nichols

(10) Patent No.: US 9,746,309 B2
(45) Date of Patent: Aug. 29, 2017

(54) REMOTE FIELD TESTING USING A PERMEABLE CORE

(71) Applicant: Schlumberger Technology Corporation, Sugar land, TX (US)

(72) Inventor: Edward Nichols, Berkeley, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 113 days.

(21) Appl. No.: 14/601,091

(22) Filed: Jan. 20, 2015

(65) Prior Publication Data
US 2015/0204648 A1 Jul. 23, 2015

(30) Foreign Application Priority Data
Jan. 20, 2014 (EP) .................................. 14305069

(51) Int. Cl.
| | |
|---|---|
| G01B 7/06 | (2006.01) |
| G01V 3/28 | (2006.01) |
| E21B 47/09 | (2012.01) |
| G01V 11/00 | (2006.01) |

(52) U.S. Cl.
CPC ............ *G01B 7/10* (2013.01); *E21B 47/0905* (2013.01); *G01V 3/28* (2013.01); *G01V 11/002* (2013.01)

(58) Field of Classification Search
CPC .................................. G01B 7/10; G01B 7/107
See application file for complete search history.

(56) References Cited

U.S. PATENT DOCUMENTS

| | | |
|---|---|---|
| 1,685,965 A | 10/1928 | Spooner |
| 2,111,210 A | 3/1938 | Ebel |
| 2,246,542 A | 6/1941 | Smith |
| 2,250,703 A | 7/1941 | Crites et al. |
| 2,573,799 A | 11/1951 | MacLean |
| 2,886,772 A | 5/1959 | Gresham et al. |
| 2,992,390 A | 7/1961 | de Witte |
| 3,225,293 A | 12/1965 | Wood et al. |
| 3,238,448 A | 3/1966 | Wood et al. |
| 3,271,644 A | 9/1966 | McShane |
| 3,449,662 A | 6/1969 | Wood |
| 3,543,144 A | 11/1970 | Walters et al. |
| 3,940,689 A | 2/1976 | Johnson, Jr. |
| 4,292,588 A | 9/1981 | Smith |
| 4,292,589 A | 9/1981 | Bonner |
| 5,397,985 A | 3/1995 | Kennedy |
| 6,597,178 B1 | 7/2003 | Nichols et al. |
| 8,358,134 B1 | 1/2013 | Hoyt |
| 2003/0169142 A1 | 9/2003 | Vicci |

(Continued)

OTHER PUBLICATIONS

Expanded search report for the equivalent European patent application No. 14305069.8 issued on Jun. 17, 2014.

(Continued)

*Primary Examiner* — Kristal Feggins
*Assistant Examiner* — Kendrick Liu
(74) *Attorney, Agent, or Firm* — Michael Dae

(57) ABSTRACT

Systems, apparatuses, and methods for measuring material thickness of one or more casings using a permeable core are presented. A magnetic field is generated using a permeable core and transmitted through one or more casings. Moreover, one or more receivers measure changes to the magnetic field.

7 Claims, 14 Drawing Sheets

(56) References Cited

U.S. PATENT DOCUMENTS

| | | | |
|---|---|---|---|
| 2006/0082374 A1 | 4/2006 | Xiao et al. | |
| 2009/0091328 A1 | 4/2009 | Clark et al. | |
| 2009/0195244 A1* | 8/2009 | Mouget | G01V 3/28 324/221 |
| 2009/0281731 A1* | 11/2009 | Morrison | G01V 3/28 702/7 |
| 2010/0308832 A1* | 12/2010 | Clark | G01V 3/28 324/338 |
| 2011/0133733 A1* | 6/2011 | Nagasaki | G01R 33/18 324/252 |
| 2015/0219601 A1* | 8/2015 | Davydov | E21B 47/00 324/229 |

OTHER PUBLICATIONS

K. Lee, et al., "Electromagnetic Method for Analyzing the Property of Steel Casting," LBNL-41525, Ernest Orlando Lawrence Berkeley National Laboratory, US, Feb. 1, 1998, pp. 1-17.

Brill, T., Le Calvez, J.L., Demichel, C., Nichols, E., and Zapata, F.B., "Quantitative Corrosion Assessment with an EM Casing Inspection Tool," SPE-SAS-1238, 2011, pp. 1-16.

Dillon, C.P., ed.: Forms of Corrosion—Recognition and Prevention, NACE Handbook 1, vol. 1. NACE International, Houston, TX, 1982.

Hansen, J. P., "The eddy current inspection method," Insight, vol. 46, #5, May 2004.

\* cited by examiner

REMOTE FIELD TESTING USING A PERMEABLE CORE

This application claims priority of EP 14305069.8, filed on Jan. 20, 2014.

BACKGROUND

The present disclosure relates to remote field eddy current (RFEC) corrosion assessment using a permeable core.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions.

In remote field testing (RFT), such as remote field eddy current (RFEC), an RFT probe is slid within an inside of one or more casings. The RFT probe creates a field and detects thickness and/or corrosion of the one or more casings by detecting changes in the created field. As the thickness of casings increase the frequency of transmission signals may decrease. This decrease in frequency may allow a receiver of the RFT probe to receive a recognizable signal from a transmitter of the RFT probe. However, when the one or more casings have large thicknesses, such as greater than three inches, even lower frequency signals may not pass through the one or more casings at ordinary signal strength levels.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an apparatus for measuring casing thickness includes a transmitter having a permeable core. The transmitter also includes a transmission winding wrapped around the permeable core where the transmission winding is configured to generate a magnetic field. The apparatus further includes one or more receivers located axially along the apparatus. Each of the one or more receivers measures field levels of the magnetic field.

In a second embodiment, a method for measuring material thickness of one or more casings includes generating a magnetic field using a permeable core. The method also includes transmitting the magnetic field through one or more casings and measuring a voltage using a monitor winding at the permeable core. Moreover, the method includes measuring an impedance, at one or more receivers, corresponding to changes in the magnetic field. Furthermore, the method includes normalizing the impedance to compensate for changes to the magnetic field resulting from the permeable core where the compensation is at least partially based on the voltage.

In a third embodiment, an apparatus for measuring thickness of one or more casings includes a transmission winding configured to generate a magnetic field. The apparatus also includes one or more receivers configured to detect changes in the magnetic field. The apparatus further includes a permeable core disposed within transmission winding and configured to boost the magnetic field. Furthermore, the apparatus includes a monitor winding disposed around the permeable core. The monitor winding is configured to measure a normalization voltage based at least in part on a strength of the magnetic field at the monitor winding. The normalization voltage is configured to enable compensation for magnetic field distortion due to the permeable core.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended just to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
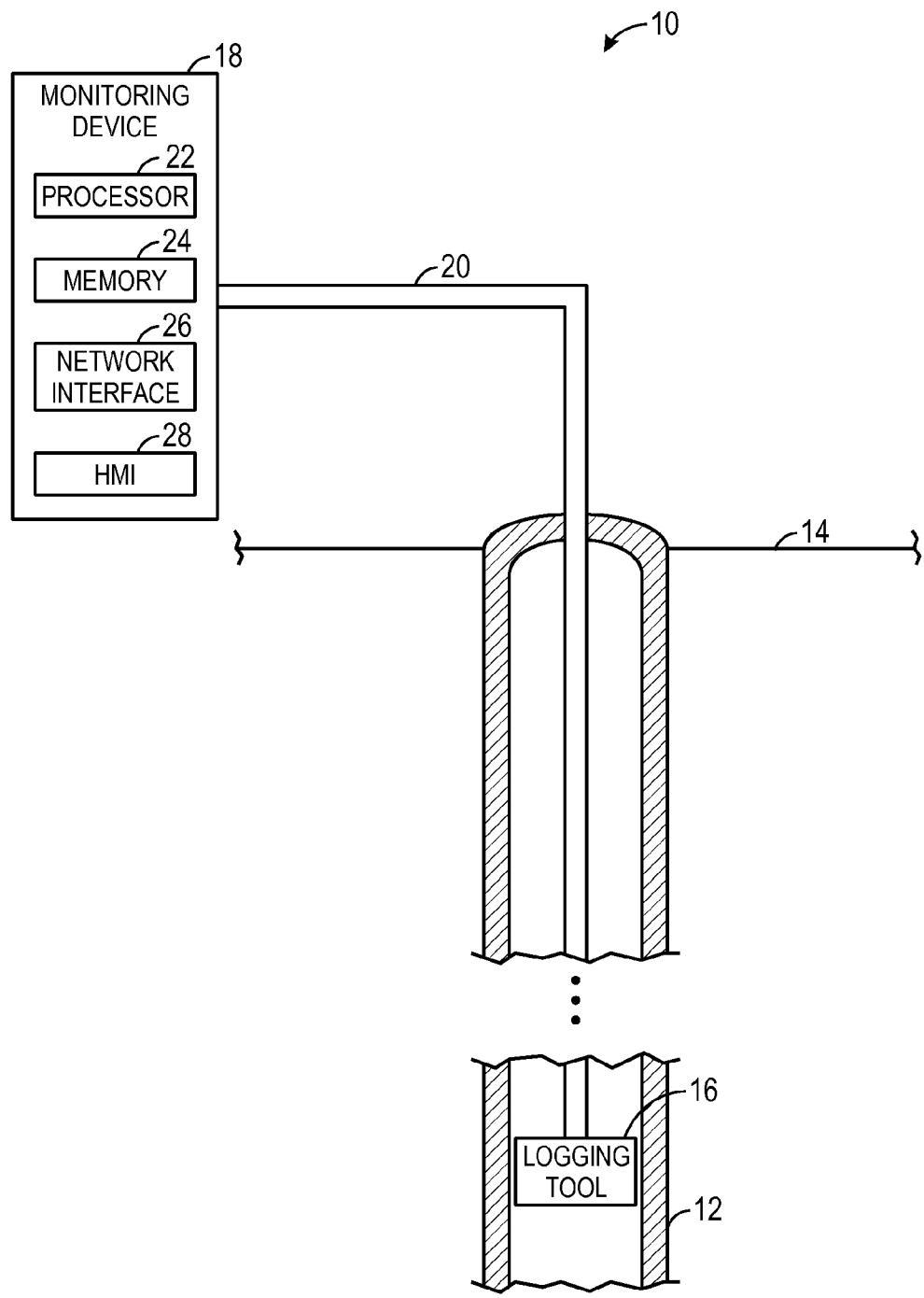
FIG. 1 is a schematic block diagram of a remote field testing probe having a permeable core, in accordance with an embodiment.

One or more specific embodiments of the present disclosure will be described below. These described embodiments are just examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to devices and methods for measuring metal thicknesses in one or more casings of a well (e.g., downwell tubular casings) using a measurement probe with a transmitter having a permeable core. The permeable core of the transmitter may generate a stronger magnetic field than a non-permeable core would generate. The stronger magnetic field may be used to determine the thicknesses of the casings even when multiple casings are located within one another in the well. By ascertaining the thicknesses of the casings, the measurement probe may identify material that has been lost during the usage of the casings owing to corrosion.

To determine material losses in the casings, the measurement probe may employ any suitable metal thickness testing, such as eddy current testing or remote field eddy current (RFEC) testing. In RFEC testing, the measurement probe may be inserted within the inner diameter of the inner most of the casings. The effectiveness of RFEC testing may depend at least partly on the strength of magnetic field, and the strength of the magnetic field may depend at least partly on the size of the measurement probe. The size of the measurement probe may depend on the logging tool in which it is installed, which itself may depend on the interior diameter of the innermost of the casings (e.g., approximately 2 inches to 36 inches). Since the innermost diameter of the casings may be relatively small, the measurement probe may increase field strength using a permeable core, rather than a non-permeable core. By boosting field strength using a permeable core, field strength may be increased without substantially increasing the diameter of the logging tool. Thus, by using the permeable core, the logging tool of this disclosure may increase the magnitude of the magnetic field as compared to a magnetic field that would be generated using a non-permeable core logging tool of the same size (e.g., between 1 and 2 inches).

Although using the permeable core increases the magnetic field strength, the magnetic field generated using the permeable core may have a distorted field when compared to a magnetic field generated using a non-permeable core. Thus, to interpret results from a permeable core, the measurement results may be normalized to compensate for the changes to the magnetic field based on the inclusion of a magnetic core. In some embodiments, the magnetic field changes may be compensated for by including a monitor winding around the core that determines a monitor voltage. The monitor voltage may indicate the strength of the magnetic field at the permeable core. As discussed below, results from receivers on a permeable core logging tool may be divided the monitor voltage to normalize the results. The normalization produces an RFEC response similar to the non-permeable core responses. By producing an RFEC response similar to the expected response from a non-permeable core, the same or similar analysis techniques may be used to identify corrosion as those used with logging tools having non-permeable cores. Since the logging tool of this disclosure includes a permeable core that can produce a stronger magnetic field than a non-permeable core, however, the logging tool may be used to measure casings having thicknesses through which a non-permeable logging tool may be infeasible owing to the constraints of a casing inner diameter and available signal strength. Furthermore, in certain embodiments, the results received may be normalized by determining a normalized impedance, which may be a ratio of air impedance to casing impedance. The normalized impedance may be divided by the transmitter voltage to determine normalized transmitter core values. The normalized transmitter core values may approximately emulate values from a non-permeable core transmitter, even though the normalized transmitter core values may derive from the permeable core that generates magnetic field signals of greater power than believed to be achievable using a non-permeable core of approximately equivalent size.

With the foregoing in mind, FIG. 1 is a block diagram depicting a remote field testing (RFT) system 10 that may be used to determine thickness (e.g., 0.1 inches to 4 inches) and/or defects due to corrosion of one or more casings 12. For example, an outer surface of the one or more casings 12 may be corroded by contact with soil and/or water. In some embodiments, the casings 12 may be measured while within the earth 14, water, and/or air. The RFT system 10 includes a logging tool 16 that may be lowered into the one or more casings 12. As will be discussed further below, the logging tool 16 generates a magnetic field signal that interacts with the casings 12. The logging tool 16 is pumped with an AC current and emits the magnetic field signal. The magnetic field signal travels outwards from the logging tool 16 through and along the casings 12. The magnetic field signal from the logging tool 16 may therefore generate eddy currents in the casings 12 that produce corresponding returning magnetic field signals. The logging tool 16 may detect the returning magnetic field signals. In areas of metal loss in the casings 12, the returning magnetic field signal may arrive at the logging tool 16 with a faster travel time (e.g., less phase change) and/or greater signal strength (e.g., higher amplitude) than otherwise, owing to the reduced path through the one or more casings 12.

The logging tool 16 may be coupled to a monitoring device 18 via a communication link 20 that maintains connection between the logging tool 16 and the monitoring device 18 as the logging tool 16 traverses the length of the one or more casings 12. The monitoring device 18 may include a processor 22, a memory 24, a network interface 26, a human machine interface (HMI) 28, and/or other electronic components suitable for monitoring and/or analyzing measurements of the logging tool 16 and relaying that information to an appropriate destination such an end user and/or log.

In the monitoring device 18, the processor(s) 22 and/or other data processing circuitry may be operably coupled with the memory 24 to execute instructions. Such programs or instructions executed by the processor(s) 22 may be stored in any suitable article of manufacture that includes one or more tangible, computer-readable media at least collectively storing the instructions or routines, such as the memory 24. The memory 24 may include any suitable articles of manufacture for storing data and executable instructions, such as RAM, ROM, rewritable flash memory, hard drives, and optical discs. Also, programs (e.g., an operating system) encoded on such a computer program product may also include instructions that may be executed by the processor(s) 22. In some embodiments, the logging tool 16 may include one or more processors that perform the below-described processing.

The network interface 26 may include circuitry for communicating over one more networks. For example, the network interface 26 may include interfaces for a personal area network (PAN), such as a Bluetooth network, for a local area network (LAN), such as an 802.11x Wi-Fi network, and/or for a wide area network (WAN), such as a 3G or 4G cellular network.

The HMI 28 may include one or more input and/or output devices for enabling communication between the processor 22, the memory 24, the network interface 26, and one or more users. In some embodiments, the HMI 28 may include one or more input devices and one or more output devices. For example, in certain embodiments, the HMI 28 may include a display and/or a keyboard, a mouse, a touch pad, or other input devices suitable for receiving inputs from a user. In some embodiments, the HMI 28 may include a touch-screen liquid crystal display (LCD), for example, which may enable users to interact with a user interface of the monitoring device 18.

Figure 2:
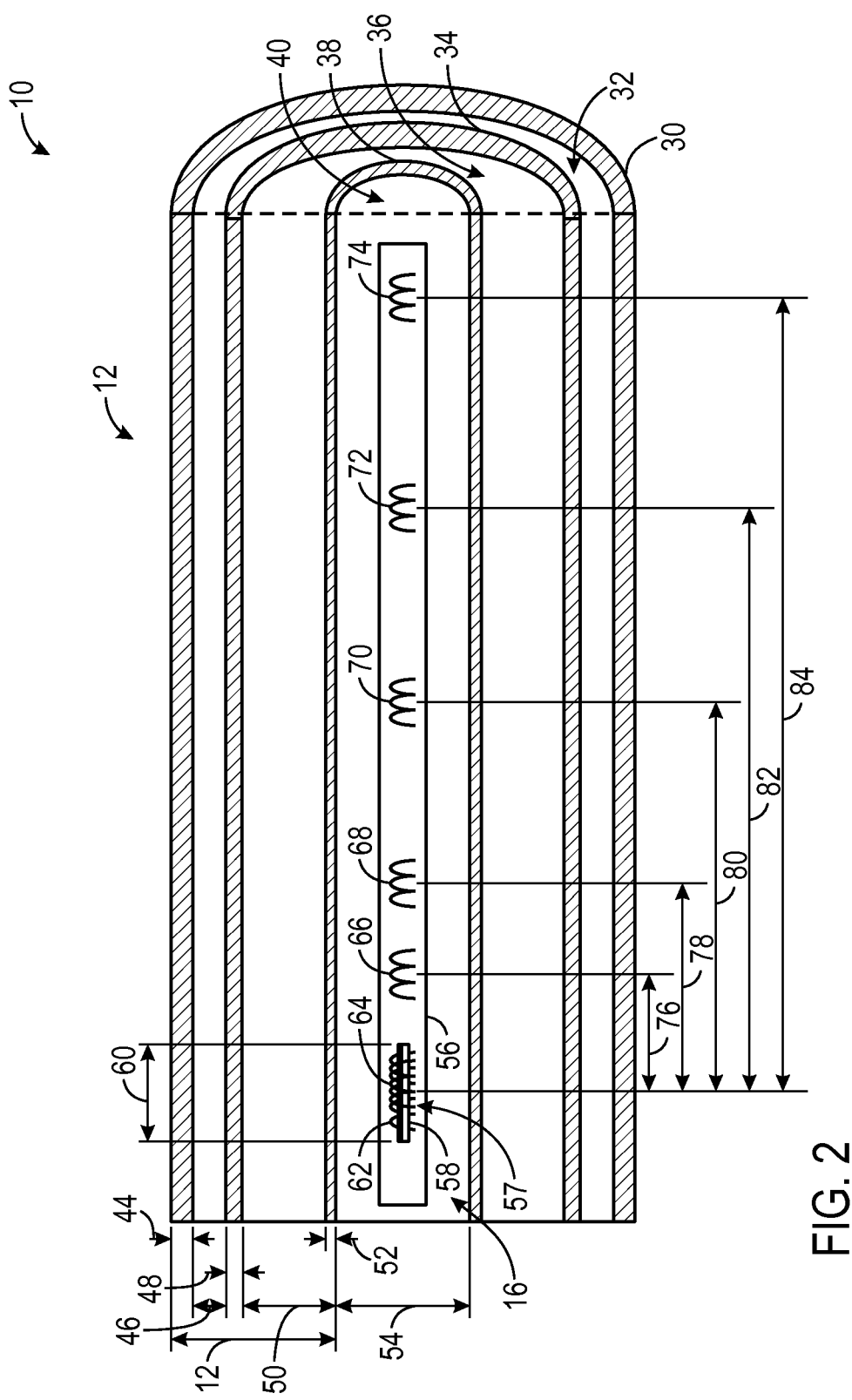
FIG. 2 is a cross-sectional view of the remote field testing probe of FIG. 1 located within multiple casings, in accordance with an embodiment.

FIG. 2 depicts a cross-sectional view of RFT system 10 located inside the one or more casings 12. The illustrated embodiment of the casing 12 includes a total thickness 42, an outer casing 44, an outer spacing 46, a middle casing 48, a middle spacing 50, and an inner casing 52. Although the illustrated embodiment illustrates three casings with a total thickness 42 including an outer casing 44, a middle casing 48, and an inner casing 52, other embodiments may include 1, 2, 4, 5, or more casings. In other words, the total thickness 42 is the sum of the thickness of the outer casing 44, the middle casing 48, and the inner casing 52. In some embodiments, the casings 12 may include at least one other casing that is non-concentric with the inner casing 54. The logging tool 16 traverses the casings 12 within an inner diameter 54 of the casings 12 located at the center of the casings 12. In certain embodiments, the logging tool 16 includes a housing 56 that encloses the logging tool 16 components. In some embodiments, the housing 56 may be a pressure-resistant housing. Within the housing 56, the logging tool 16 includes a transmitter 57 that includes a permeable transmitter core 58 having a length 60. In some embodiments, the permeable core 58 may be formed from silicon steel ($\mu$=3,000-20,000), ferrite materials ($\mu$=300-2,000), or mu metals ($\mu$=10,000-50,000). In some embodiments, two windings may be located around the permeable transmitter core 58: a transmission winding 62 and a monitor winding 64. By using a permeable core, the transmission winding 62 may produce a field that is boosted over the strength of the transmission winding 62 if it were instead wound around a non-permeable core. For example, in some embodiments, the transmission winding 62 with the permeable core 58 may create a magnetic field that is boosted by at least a factor of 100 over a transmission winding 62 with a non-permeable core of approximately the same size. By boosting the generated field, noise measured at the receiver windings (e.g., receivers 66, 68, 70, 72 and/or 74) generated by travel through the casings 12 may be relatively small in relation to the boosted field. Accordingly, a permeable core 58 may enable logging metal thicknesses more quickly because the logging tool 16 may be moved through the casings 12 more rapidly due to the higher signal to noise ratio (SNR) achieved from the boosted field. This may reduce the time to log the metal thicknesses of the casings 12 accordingly. The permeable core 58 makes a magnetic circuit, passing axially along the core 58, through an air gap between the core 58 and the metallic casing 12 and back in the reverse direction through the casing 12.

As previously discussed, the permeable core 58 may distort the geometry of the magnetic field created by the transmission winding 62. To use modeling techniques, analytics, and/or equipment that use predictable magnetic field behavior that may be generated by a non-permeable (e.g., air) core, the distorted field may resulting from the permeable core 58 be compensated for by normalizing field detection results by using the monitor winding 64, as will be discussed further below.

The logging tool 16 also may include one or more receivers (e.g., 66, 68, 70, 72, and/or 74). In the illustrated embodiment, the receivers 66, 68, 70, 72, and 74 are each located in a line along the logging tool 16. Each receiver 66, 68, 70, 72, and 74 is located some distance away from the transmitter 57. For example, the receiver 66 may be located a distance 76 from the transmitter 57, the receiver 68 may be located a distance 78 from the transmitter 57, the receiver 70 may be located a distance 80, the receiver 72 may located a distance 82 from the transmitter 57, and the receiver 74 may be located a distance 84 from the transmitter 57. In certain embodiments, each distance 78, 80, 82, and 84 may be a multiple of the distance 76. For example, the distance 78 may be twice the distance 76, and distances 80, 82, and 84 may respectively be three, four, and five times the distance 78. Furthermore, in some embodiments, the distance 76 may be greater than or equal to the length 60. In certain embodiments, the receivers 66, 68, 70, 72, or 74 may be located at distances of between 7 inches or less to 90 inches or more from the transmitter 57. The receivers 66, 68, 70, 72, or 74 may detect the strength and/or phase of the returning magnetic field from the casing 12. These detected values may then be used to determine a thickness of the casing 12 using any suitable RFT analyses. Although the receivers 66, 68, 70, 72, or 74 are illustrated as axially located receivers, in some embodiments, at least some of the receivers 66, 68, 70, 72, and 74 may be located azimuthally adjacent to an inner wall of the casing. In certain embodiments, at least some of the receivers 66, 68, 70, 72, and 74 may have a radial sensitivity (e.g., saddle coils, Hall-effect sensor, giant magneto-resistive sensor) configured to detect defects or transverse cracks in the casing 12.

Figure 3:
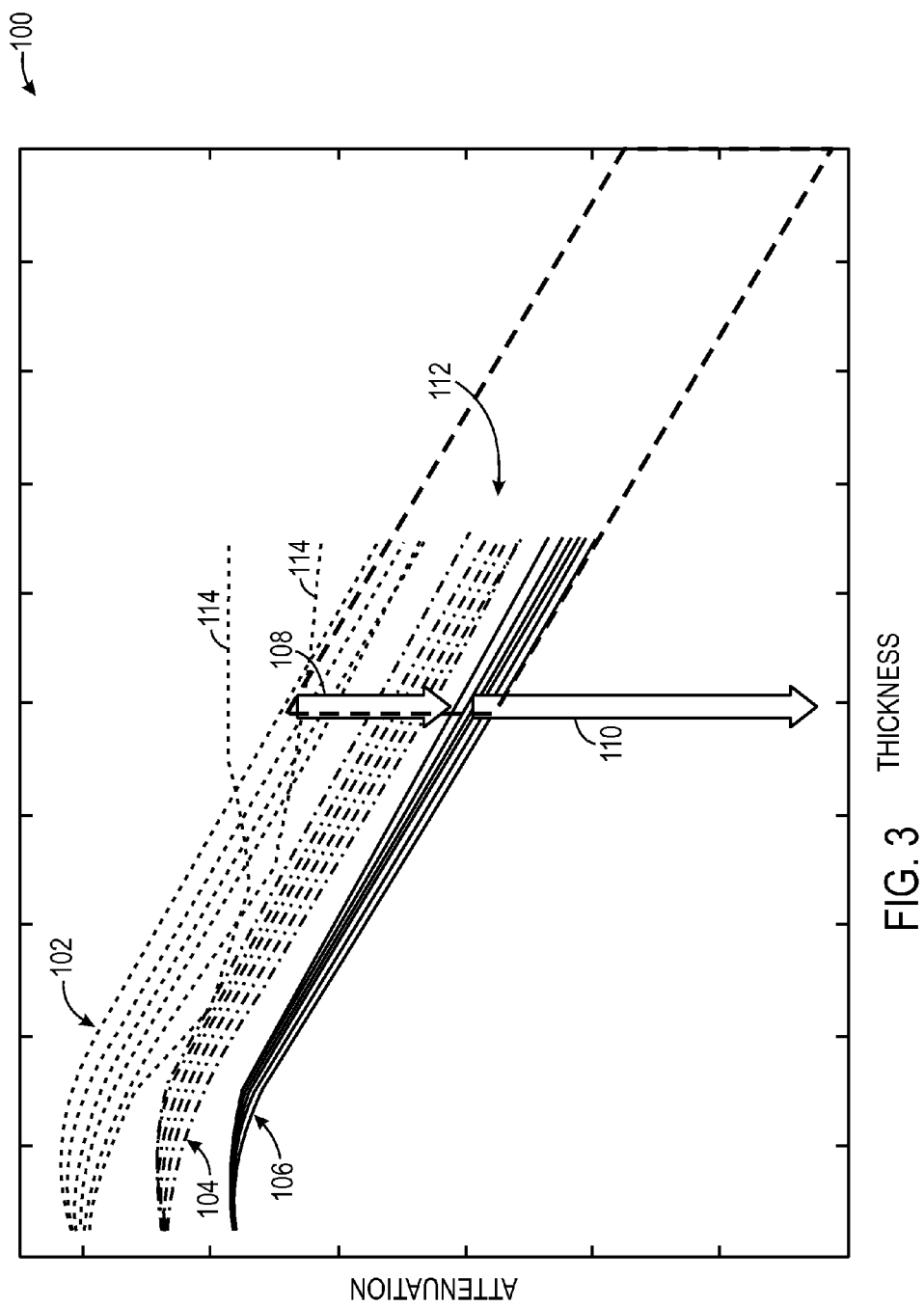
FIG. 3 is a plot illustrating signal attenuation attributed to casing thickness and spacing, in accordance with an embodiment.
Figure 4:
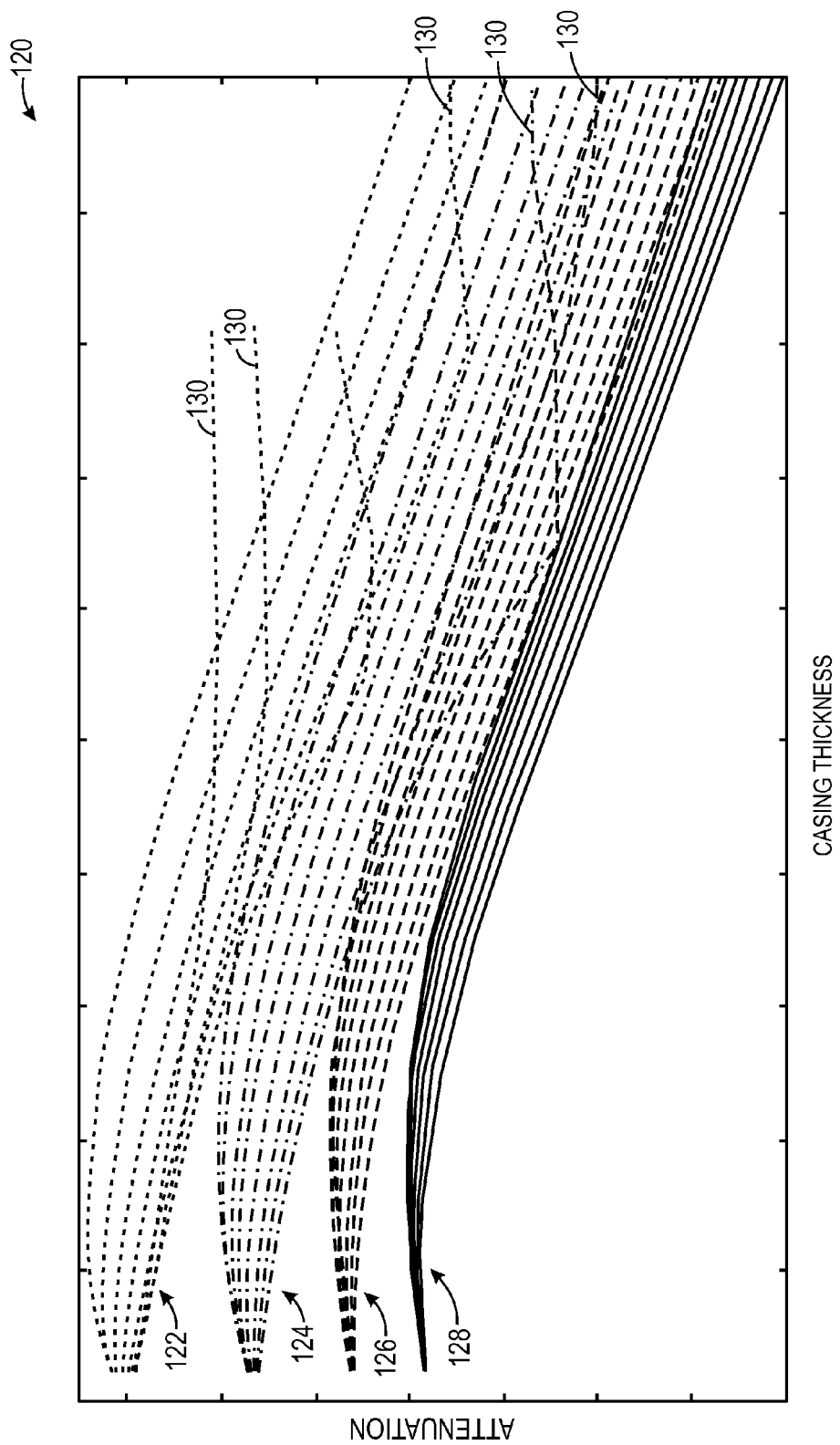
FIG. 4 is a plot illustrating signal attenuation attributed to casing thickness and spacing using a lower frequency signal than the signal of FIG. 3, in accordance with an embodiment.

FIG. 3 is a plot illustrating the challenges in RFT operation for increased casing thickness and sizes. Graph 100 shows attenuation of signals as thickness increases and attenuation based on casing size. Group 102 illustrates results for different casing sizes (e.g., 2.5, 5, 8, 11, 15, and 20 inch thicknesses) at a first receiver (e.g., receiver 66), and groups 104 and 106 respectively illustrate results for different casing sizes at a second and third receivers (e.g., receivers 68 and 70). Loss 108 illustrates a loss attributed to spacing from the receivers further from the transmitter 57 (e.g., receivers 68 and 70) and the closer receiver (e.g., receiver 66). Loss 110 illustrates the loss attributed to thickness of the casings 12. As illustrated a large portion of the loss may be attributed to casing thickness. When the loss becomes dramatic, such as in region 112, compensation for attenuation may be employed. One such method of compensation includes using lower frequencies (e.g., 0.5-100 Hz). FIG. 4 illustrates a plot 120 of attenuation in relation to casing thickness at four receivers (e.g., receivers 66, 68, 70, and 72). Groupings 122, 124, 126, and 128 each respectively correspond to various casing sizes (e.g., 2.5, 5, 8, 11, 15, 20, 25, and 30) for different receivers (e.g., receivers 66, 68, 70, and 72). As illustrated, thickness loss is less dramatic (e.g., there is a more gradual slope) when lower frequencies are used, even if more non-linear regions 130 exist. The tradeoff for lower frequencies is that receiver sensitivity may be lessened while interference may increase owing to noise arising from the motion of the logging tool 16 along the casing 12 and noise from electronic sources (e.g., within the logging tool 16). Accordingly, even with lower frequencies, a boosted magnetic field (e.g., as provided by the permeable core 58) may increase the SNR of the logging tool 16.

Figure 5:
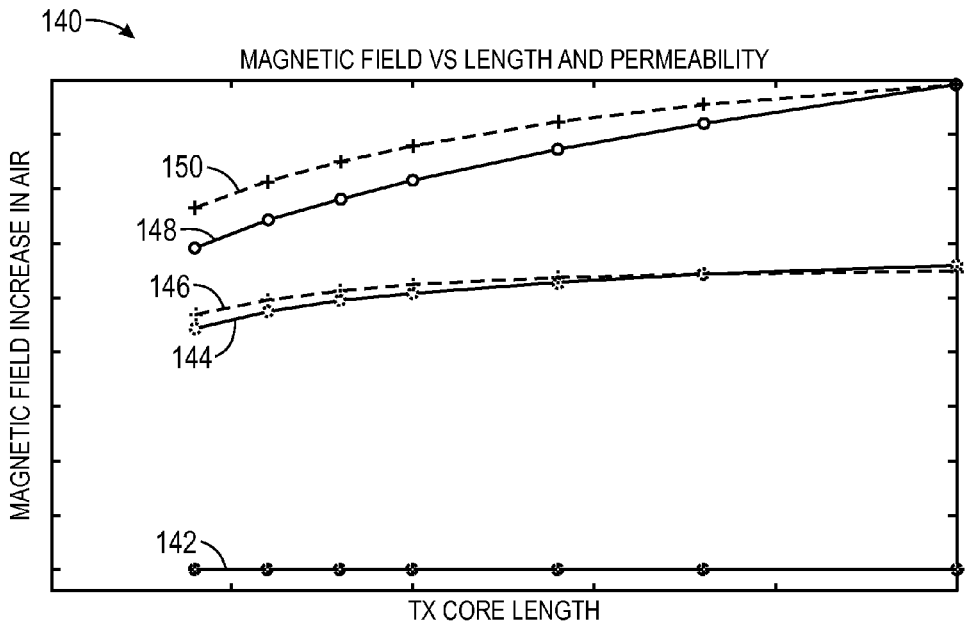
FIG. 5 is a plot illustrating a relationship between core length and core permeability and magnetic field strength, in accordance with an embodiment.
Figure 6:
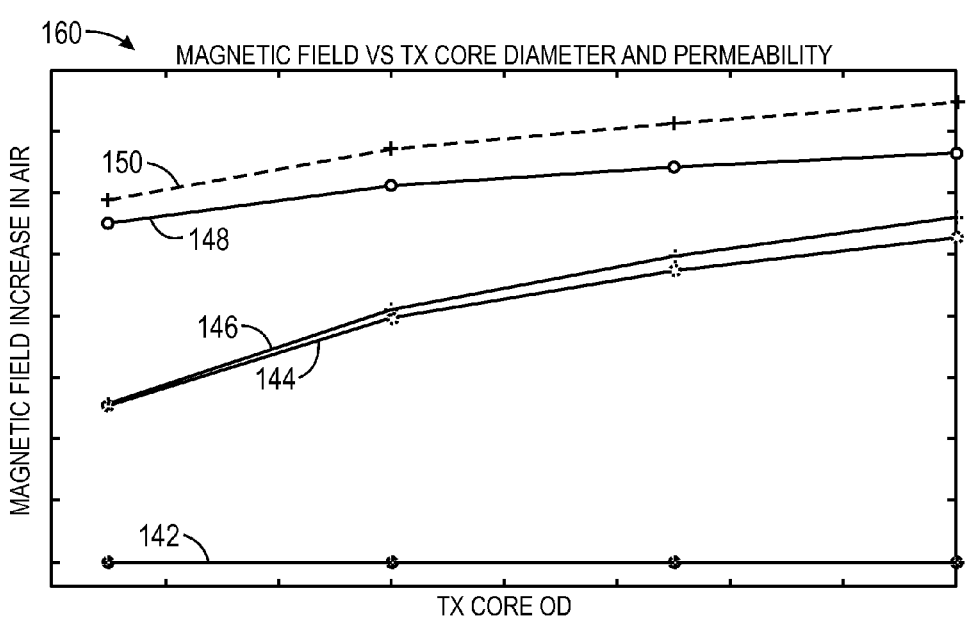
FIG. 6 is a plot illustrating a relationship between core outside diameter and core permeability and magnetic field strength, in accordance with an embodiment.

FIG. 5 illustrates increased field strength obtained using permeable cores 58 of different permeabilities and illustrating resultant magnetic fields in air and in casings. A graph 140 shows the resulting field strengths for three different core permeabilities. For example, a low/non-permeable core response 142 may illustrate a response to a core having a relatively low permeability (e.g., $\mu=1$) that has approximately equivalent strength in air or in casings. An intermediate permeability air response 144 and an intermediate permeability casing response 146 illustrate a field strength for a permeable core 58 having an intermediate permeability (e.g., $\mu=$between 1 and 300, such as 50) that has a greater field strength through air or casings than cores with lower permeabilities or non-permeable cores. A high-permeability core air response 148 and a high-permeability core casing response 146 illustrate relative field strengths for a relatively high permeability (e.g., greater than $\mu=300$) core. As illustrated, as the core permeability increases, field strength increases. Furthermore, as the core length 60 increases the field strength also generally increases until saturation is reached. FIG. 6 illustrates the changes to the high, intermediate, and low permeabilities as a function of the outside diameter (e.g., 0.75 to 1.5 inches) of the permeable core 58 changes. As illustrated in the graph 160, field strength generally increases as the outside diameter of the permeable core 58 increases for lines 142-150, where the low/non-permeable response 142 represents a magnetic field strength in air or in the casing 12 using a low/non-permeable core, the intermediate permeability air response 144 and the intermediate permeability casing response 146 represents a magnetic field strength respectively in air or the casing using an intermediate permeability core, and the high-permeability air response 148 and the high-permeability casing response 150 represents a magnetic field strength respectively in air or the casing using a core with a relatively high permeability.

Figure 7:
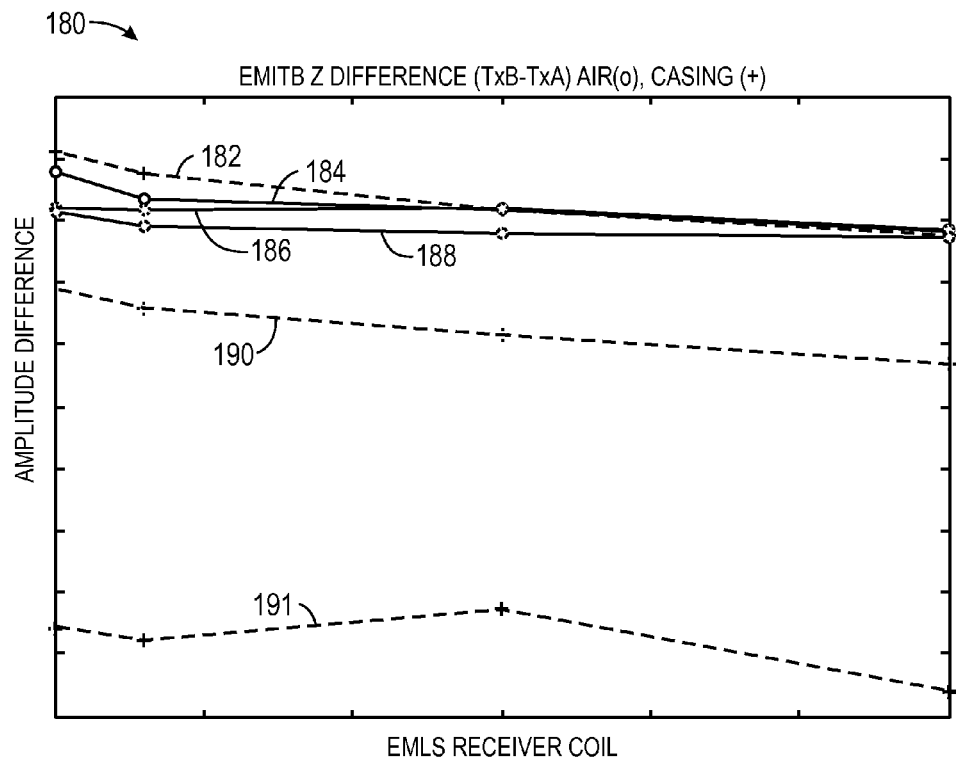
FIG. 7 is a plot illustrating an increase in the magnetic field amplitude using a permeable core rather than a non-permeable core at different frequencies through air and casings, in accordance with an embodiment.

FIG. 7 illustrates the amplitude increase when a permeable core 58 is used in the transmitter 57 rather than a non-permeable core. A graph 180 illustrates the amplitude difference at each receiver 66, 68, 70, 72, and 74 along the logging tool at different frequencies and through different mediums. Line 182 represents an amplitude increase in using a permeable core 58 with a lower frequency signal (e.g., 4 Hz) transmitted through at least one casing 12 (e.g., 7 inch casing). Line 184 represents an amplitude increase in using a permeable core 58 compared with the same frequency signal transmitted through air. Line 186 represents an amplitude increase in using a permeable core 58 compared with an intermediate frequency signal (e.g., 9 Hz) transmitted through the air. Line 188 represents an amplitude increase in using a permeable core 58 compared with a higher frequency signal (e.g., 35 Hz) through the air. Line 190 represents an amplitude increase in using a permeable core 58 compared with the intermediate frequency signal through a casing 12. Similarly, line 191 represents an amplitude increase in using a permeable core 58 compared with the high frequency signal through a casing. As graph 180 shows, the amplitude increase is more dramatic with low frequency signals (e.g., 2 Hz, 4 Hz, etc.).

As shown in FIGS. 5-7, the addition of a permeable core 58 may substantially boost the power of the transmitted magnetic field dependent upon the frequency of the signal, medium of transmission, core length 60, outside diameter of the core 58, and the permeability of the core 58. The permeable core 58 changes the way that the magnetic field interacts with the casings 12. The permeable core 58 makes a magnetic circuit, passing axially along the core 58, through an air gap between the core and the metallic casing 12 and back in the reverse direction through the casing 12. FIGS. 8A-8D illustrate calculated field levels versus casing thickness at different spacings and different casing sizes from the transmitter 57. For example, grouping 192 of FIG. 8A may represent field levels for various casing sizes measured at the transmitter 57 (e.g., distance=0 inches). Within the group various casing sizes (e.g., 2.5, 5, 11, 20, and 35 inches) are represented. Similarly, groupings 194, 196, and 198 of FIGS. 8B, 8C, and 8D respectively, illustrate field strengths measured at other receivers (e.g., receivers 68, 70, 72, and/or 74) located farther from the transmitter 57. For example, in some embodiments, the grouping 194 may represent field level at receiver 66 located seven inches from the transmitter, the grouping 196 may represent field level at a receiver 68 located twelve inches from the transmitter, and the grouping 198 may represent field level at a receiver 74 located ninety inches from the transmitter. The field level may be graphed as a phase of normalized impedance ($Z_n$) where the normalized impedance may be determined from the following equation:

$$Z_n = \frac{Z_{casing}}{Z_{air}}, \quad \text{(Equation 1)}$$

where $Z_{casing}$ is the impedance in the casing 12 and $Z_{air}$ is the impedance in air. Furthermore, both the $Z_{casing}$ and the $Z_{air}$ may be determined by the following equation:

$$Z = \frac{V_{Rx}}{I_{Tx}}, \quad \text{(Equation 2)}$$

where $V_{Rx}$ is the voltage measured at a respective receiver 68, 70, 72, and/or 74 and $I_{Tx}$ is the current measured at the transmitter 57.

Figure 8A:
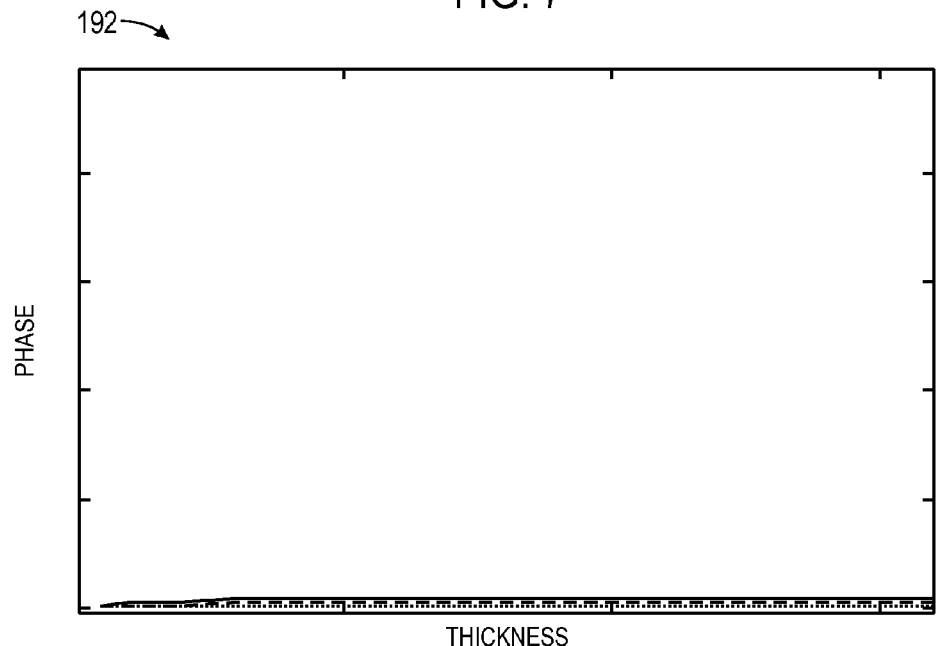
FIG. 8A is a plot illustrating a magnetic field level generated by a non-permeable core detected at a first receiver as casing thickness changes, in accordance with an embodiment.
Figure 8B:
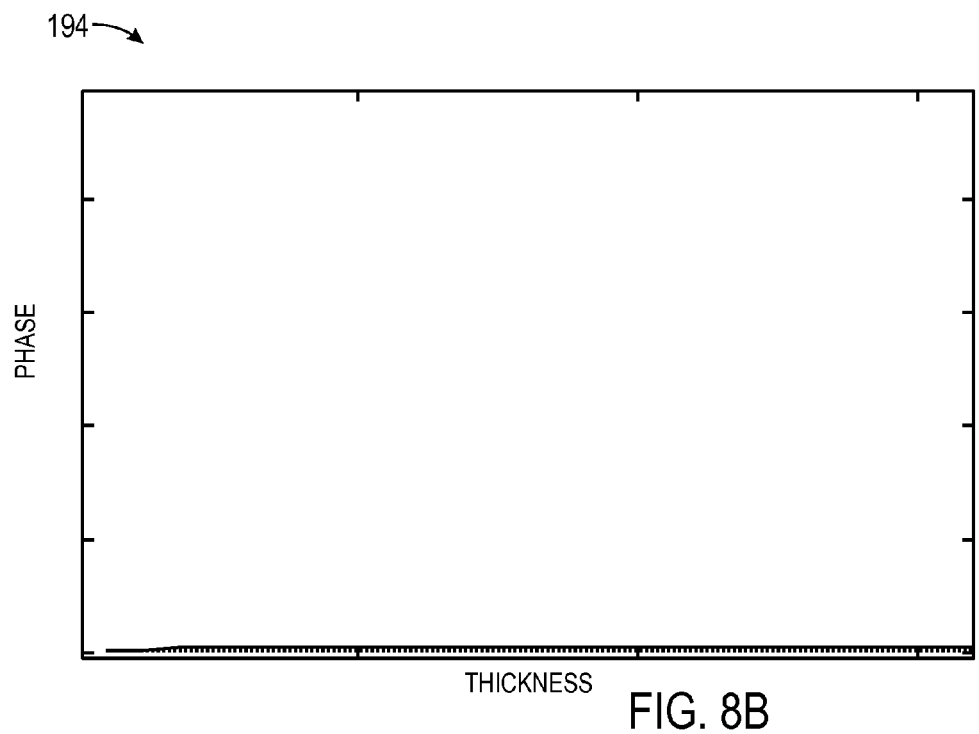
FIG. 8B is a plot illustrating a magnetic field level generated by a non-permeable core at a second receiver as casing thickness changes, in accordance with an embodiment.
Figure 8C:
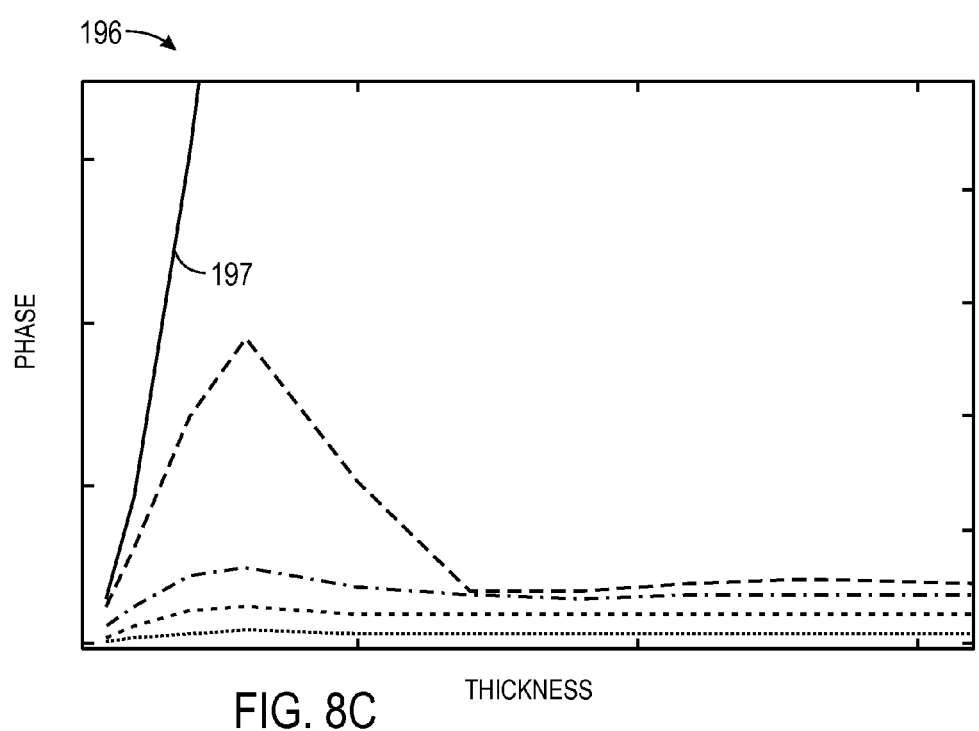
FIG. 8C is a plot illustrating a magnetic field level generated by a non-permeable core at a third receiver as casing thickness changes, in accordance with an embodiment.
Figure 8D:
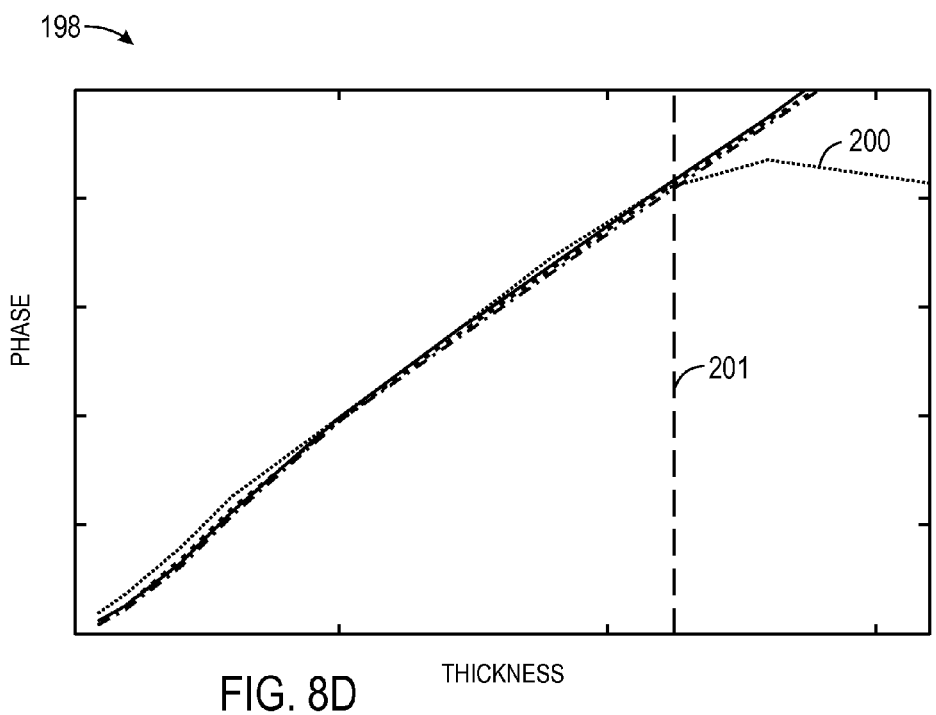
FIG. 8D is a plot illustrating a magnetic field level generated by a non-permeable core at a fourth receiver as casing thickness changes, in accordance with an embodiment.
Figure 9A:
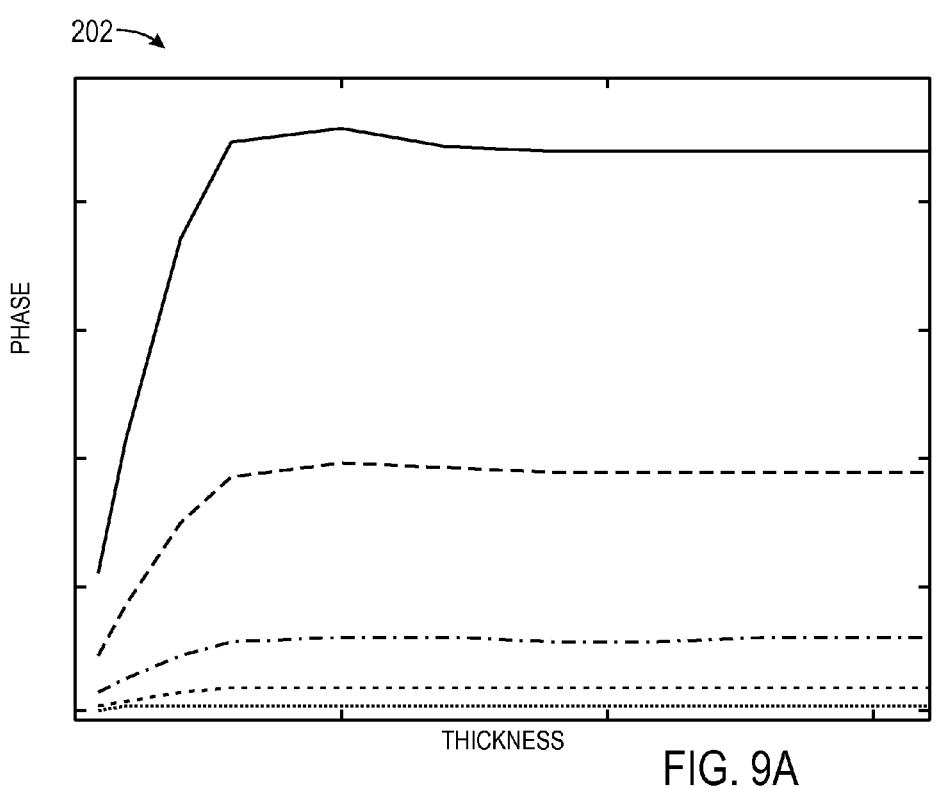
FIG. 9A is a plot illustrating a magnetic field level generated by a permeable core detected at the first receiver of FIG. 8A as casing thickness changes with factors the same as FIG. 8A, in accordance with an embodiment.
Figure 9B:
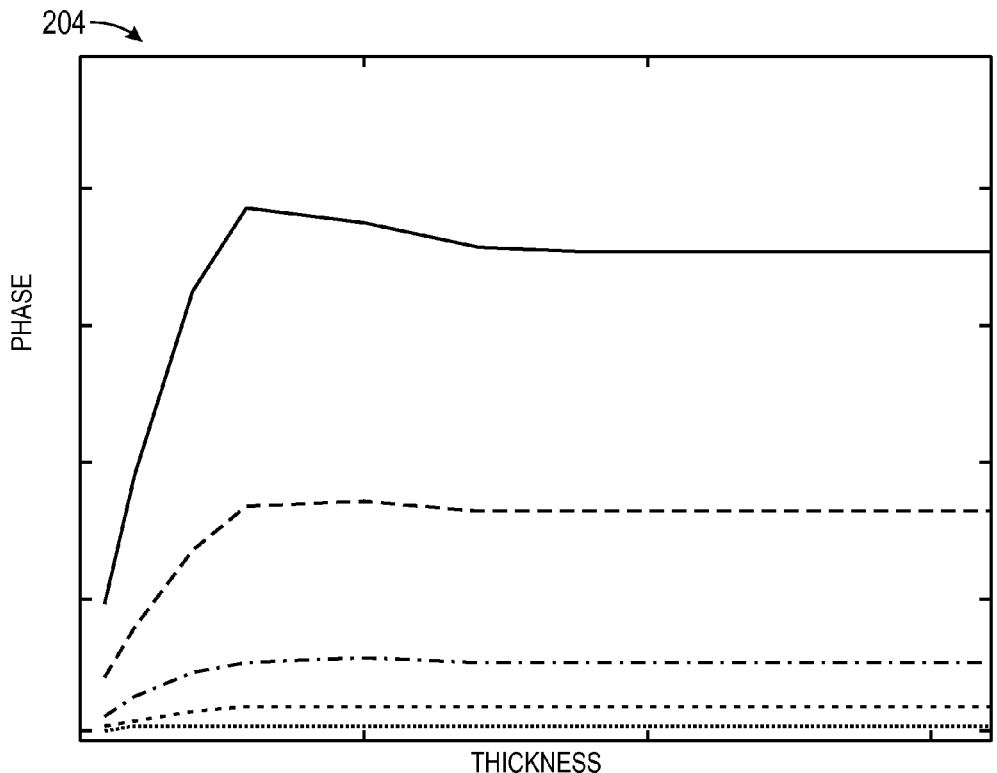
FIG. 9B is a plot illustrating a magnetic field level generated by a permeable core detected at the second receiver of FIG. 8B as casing thickness changes with factors the same as FIG. 8B, in accordance with an embodiment.
Figure 9C:
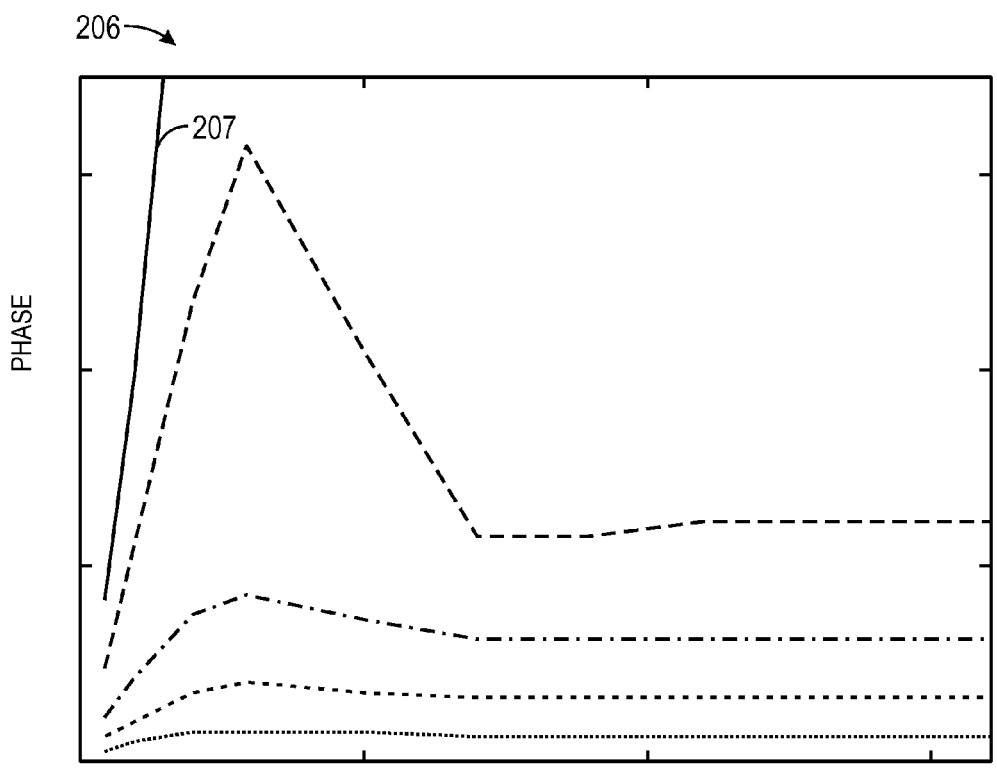
FIG. 9C is a plot illustrating a magnetic field level generated by a permeable core detected at the third receiver of FIG. 8C as casing thickness changes with factors the same as FIG. 8C, in accordance with an embodiment.
Figure 9D:
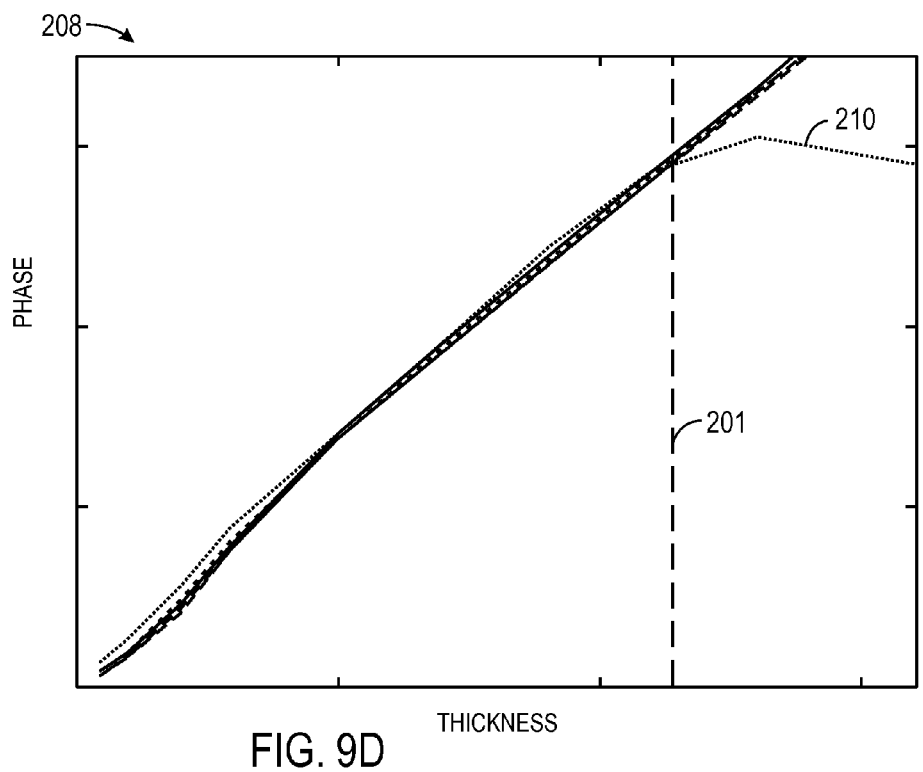
FIG. 9D is a plot illustrating a magnetic field level generated by a permeable core detected at the fourth receiver of FIG. 8D as casing thickness changes with factors the same as FIG. 8D, in accordance with an embodiment.
Figure 10A:
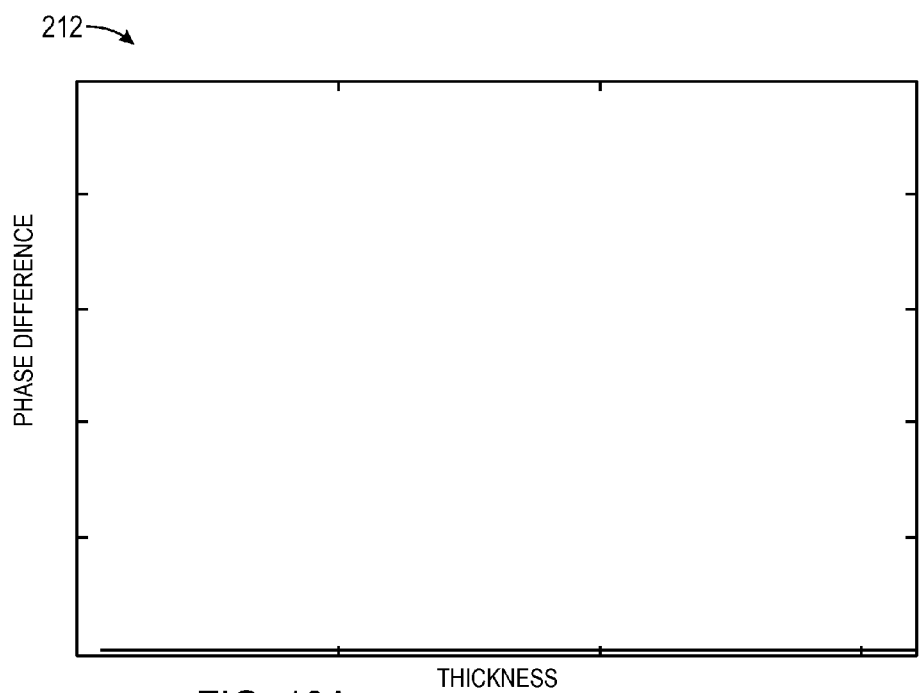
FIG. 10A is a plot illustrating the magnetic field level of FIG. 9A normalized by a monitor voltage, in accordance with an embodiment.
Figure 10B:
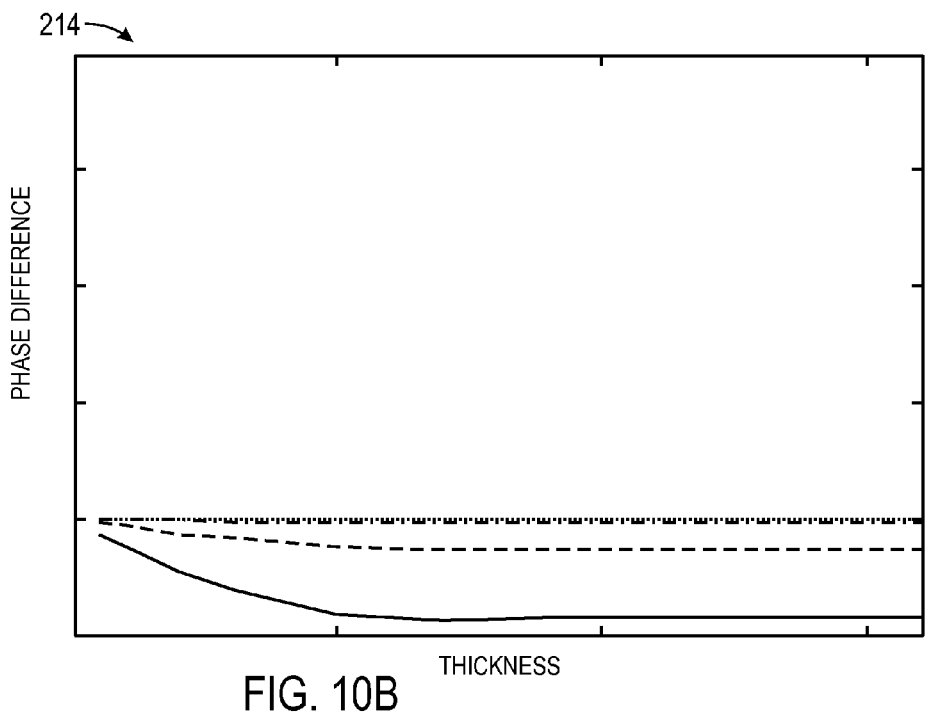
FIG. 10B is a plot illustrating the magnetic field level of FIG. 9B normalized by a monitor voltage, in accordance with an embodiment.
Figure 10C:
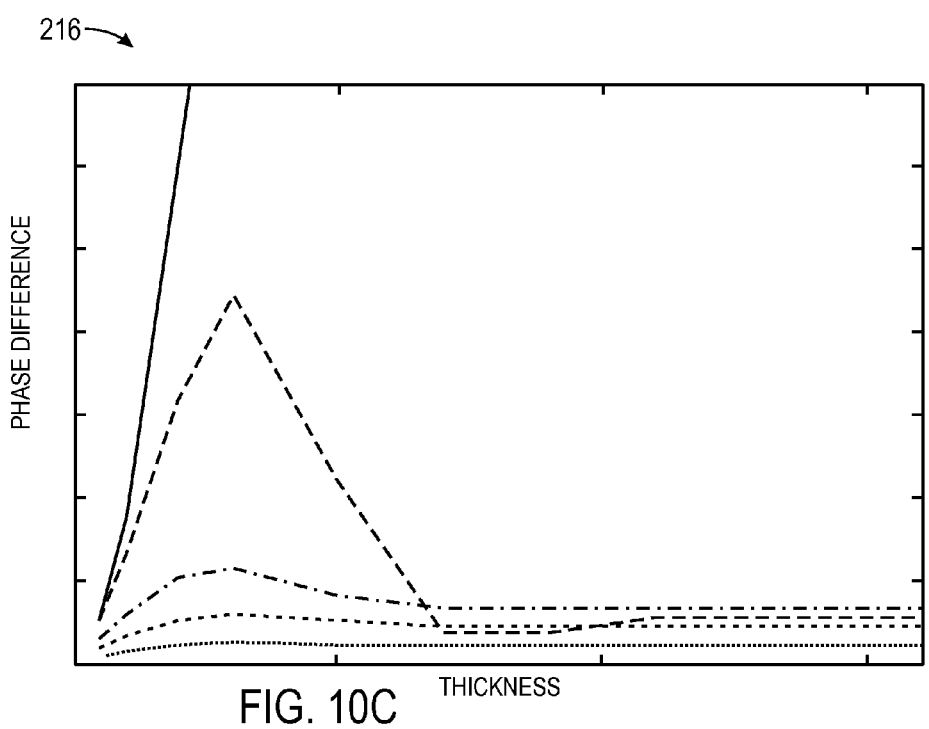
FIG. 10C is a plot illustrating the magnetic field level of FIG. 9C normalized by a monitor voltage, in accordance with an embodiment.
Figure 10D:
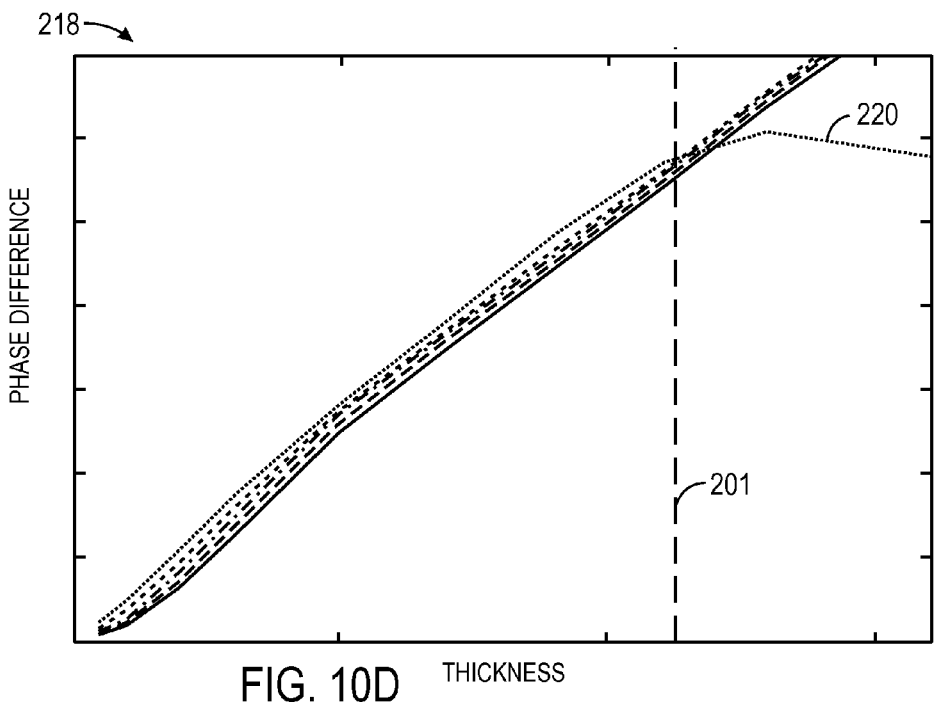
FIG. 10D is a plot illustrating the magnetic field level of FIG. 9D normalized by a monitor voltage, in accordance with an embodiment.
Figure 11A:
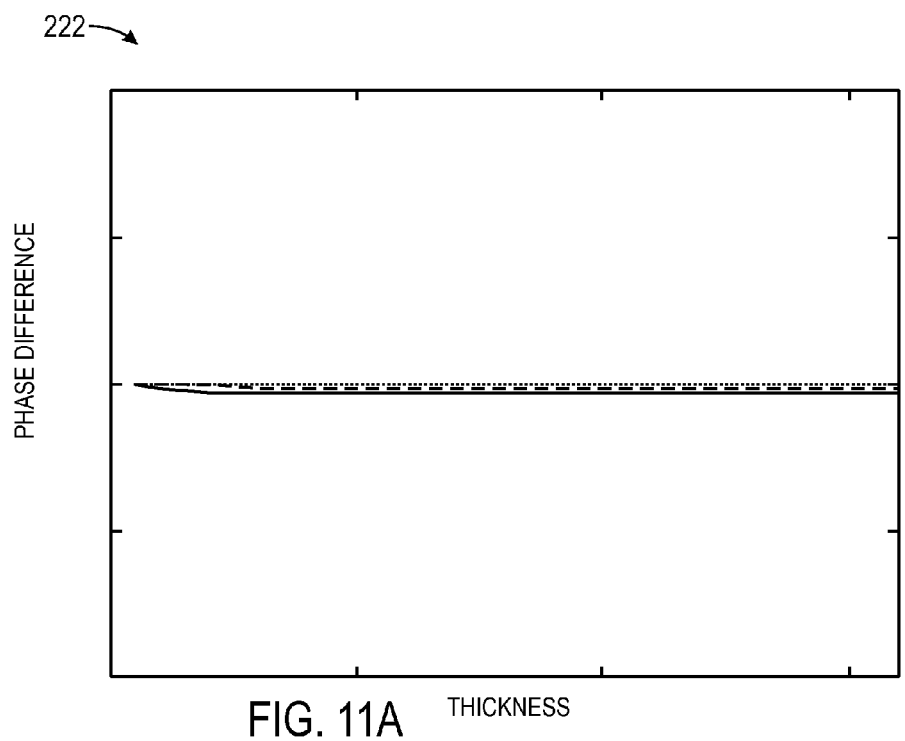
FIG. 11A is a plot illustrating the phase difference between the magnetic field levels of FIGS. 9A and 10A, in accordance with an embodiment.
Figure 11B:
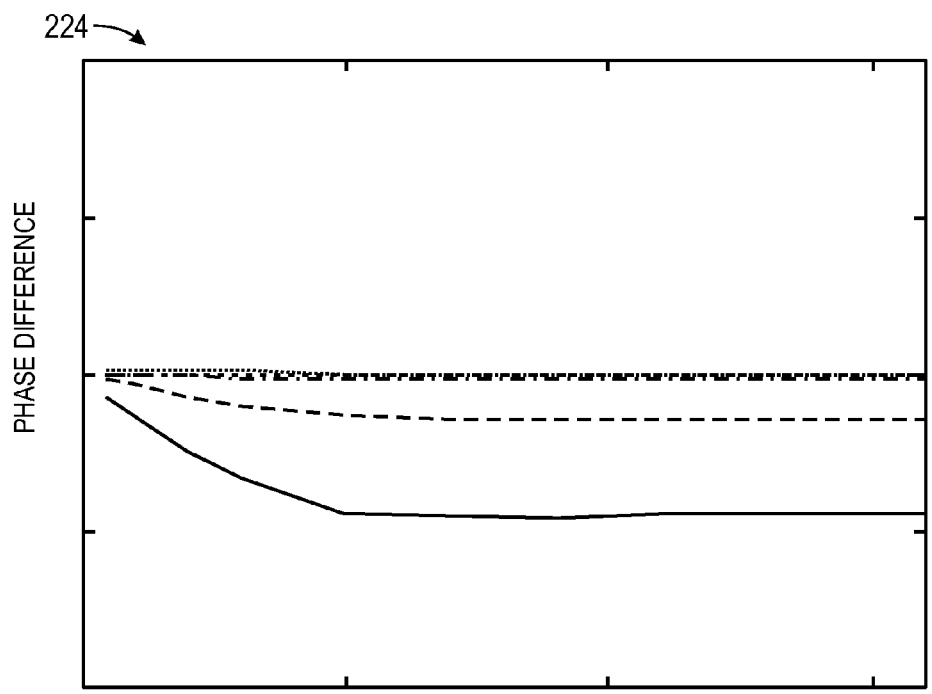
FIG. 11B is a plot illustrating the phase difference between the magnetic field levels of FIGS. 9B and 10B, in accordance with an embodiment.
Figure 11C:
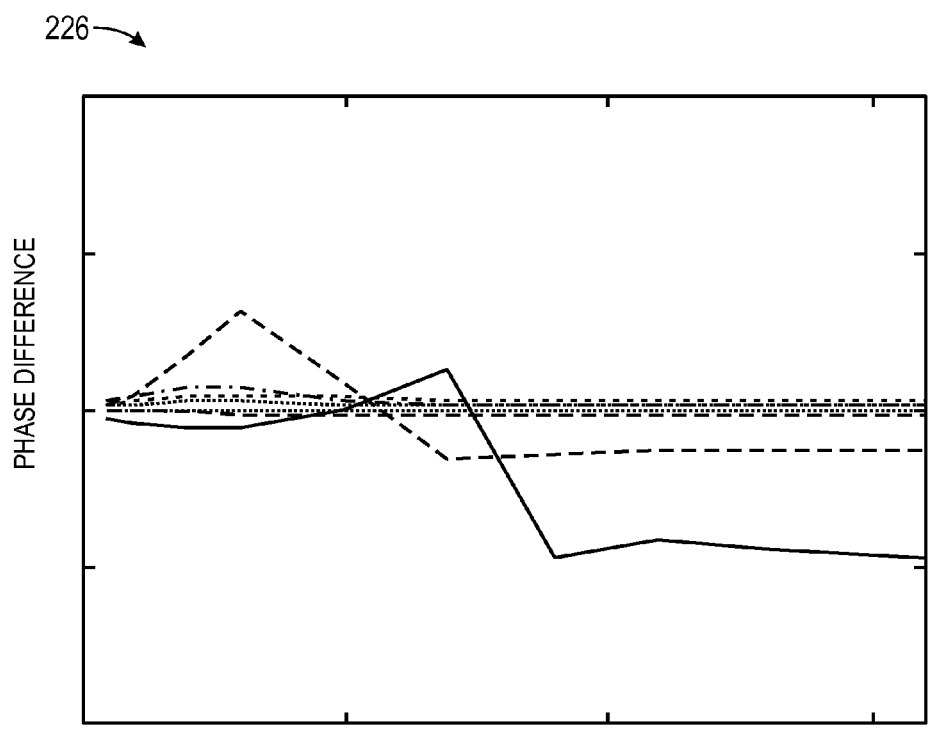
FIG. 11C is a plot illustrating the phase difference between the magnetic field levels of FIGS. 9C and 10C, in accordance with an embodiment.
Figure 11D:
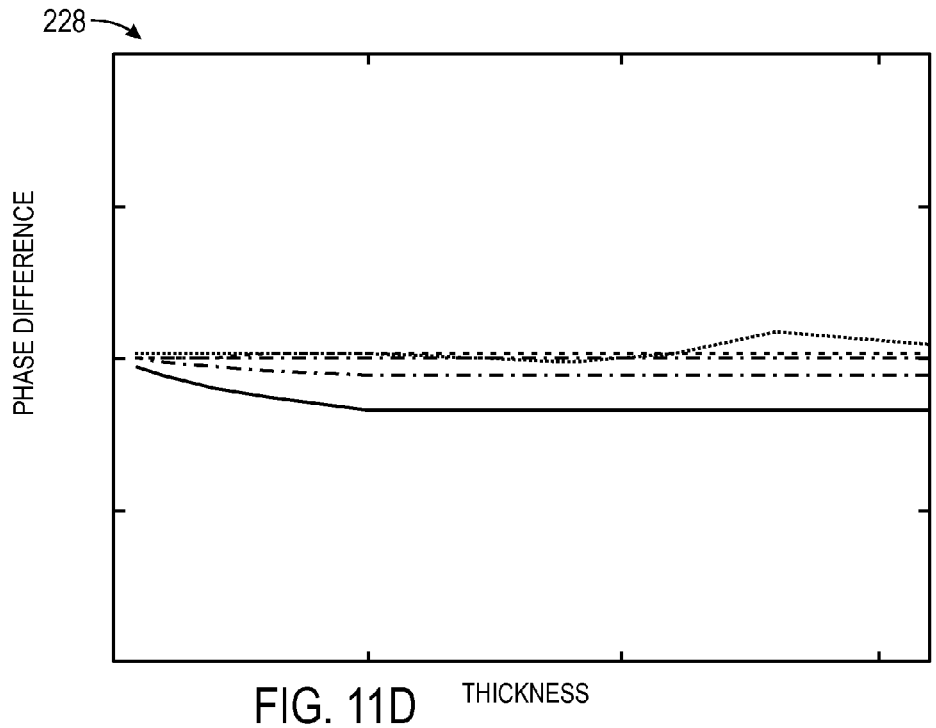
FIG. 11D is a plot illustrating the phase difference between the magnetic field levels of FIGS. 9D and 10D, in accordance with an embodiment.

As illustrated in FIGS. 8A, 8B, and 8C, groupings 192, 194, and 196 do not show RFEC behavior, other than the line 197. In the grouping 198 of FIG. 8D, each of the lines show RFEC behavior except line 200, which has an RFEC behavior that breaks down above a threshold 201. FIGS. 9A-9D illustrate the same modeling as FIGS. 8A-8D, except that the permeable core 58 (e.g., μ=500-2,000) is used in FIGS. 9A-9D and a non-permeable core (e.g., μ=1) is used in FIGS. 8A-8D. For groupings 202, 204, 206, and 208 of FIGS. 9A-9D, the addition of the permeable core 58 changes the normalized impedance phase results. However, as illustrated, the line 207 and the grouping 208 still show RFEC behavior. In fact, lines 207 and 210 break down at the respective 201, similar to the breakdowns in FIGS. 9C and 9D.

To compensate for changes resulting from the inclusion of the permeable core 58, a further normalization calculation may be performed by dividing received voltages by the monitor winding 56. In other words, a permeable core normalized impedance may be determined from the following equation:

$$Z_{NTM} = \frac{Z_N}{T_M}, \quad \text{(Equation 3)}$$

where $Z_{NTM}$ is the impedance normalized for a permeable core and $T_M$ is the voltage measured at the monitor winding 56 wound around the permeable core 58. FIGS. 10A-10D illustrate phase differences of the monitor winding 56 corrected field plotted on the same scale as FIGS. 8A-8D. As illustrated, the groupings 212, 214, 216, and 218 closely align with the groupings 192, 194, 196, and 198 of FIGS. 8A-8D. FIGS. 11A-11D show the respective differences between the groupings 212, 214, 216, and 218 and the groupings 192, 194, 196, and 198. As shown, the differences between respective groupings are nominal after normalization. In light of the nominal differences between a normalized phase for a non-permeable core and a doubly-normalized phase for the permeable core 58, the permeable core 58 may be used by adding a monitor winding 56 and normalizing the resulting field strength to reliably compensate for changes to the field resulting from the permeable core 58. Furthermore, by using the permeable core 58, corrosion measurements may be made in larger and thicker casings 12 than using a non-permeable core. Additionally, the total number of casings 12 that may be measured using the permeable core 58 may be higher than may be measured using a non-permeable core.

Figure 12:
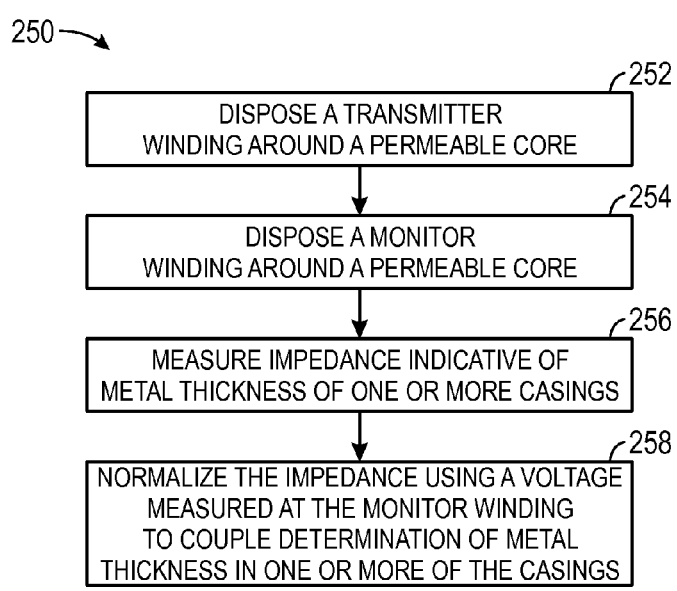
FIG. 12 is a flow diagram view illustrating a process for detecting material thickness of one or more casings using the remote field testing probe of FIG. 1.

FIG. 12 illustrates a process 250 for measuring material thickness using the logging tool 16 having the permeable core 58. The process 250 includes disposing a transmitter winding 62 around a permeable core 58 (block 252) for producing a magnetic field around the permeable core 58. The process 250 also includes disposing a monitor winding 64 around the permeable core 58 (block 254) to compensate for changes to the magnetic field arising from using the permeable core 58. The process 250 also includes measuring impedances indicative of metal thickness of one or more casings 12 (block 256) based on the magnetic signals that return to the receivers 68, 70, 72, and/or 74. In certain embodiments, the impedance measurement may include using a normalized impedance determined using Equations 1 and 2. The process 250 may also include normalizing the impedance using a voltage measured at the monitor winding 64 to enable determination of metal thickness in one or more of the one or more casings 12 (block 258). In some embodiments, the normalization for the permeable core 58 may be performed using Equation 3, which divides the normalized impedance of Equation 1 by a voltage measured at the monitor winding 64. In other words, in such embodiments, the normalized impedance for the permeable core 58 may be a ratio of the impedance to the voltage measured at the monitor winding 64.

Although some of the foregoing discussion contemplates analysis in the frequency domain, some embodiments may include analyzing the transients in the time domain where later in time corresponds to lower frequencies. The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. An apparatus for measuring material thickness of one or more casings comprising:
   a transmission winding configured to generate a magnetic field;
   one or more receivers configured to detect changes in the magnetic field;

a permeable core disposed within the transmission winding and configured to boost the magnetic field; and a monitor winding disposed around the permeable core and configured to measure a normalization voltage based at least in part on a strength of the magnetic field at the monitor winding, wherein the normalization voltage is configured to enable compensation for magnetic field distortion due to the permeable core, wherein the apparatus measures a standardized impedance value, at the one or more receivers, corresponding to the changes in the magnetic field and determines a normalized impedance using the following equation:

$$Z_{NTM} = \frac{Z_N}{T_M}$$

where $Z_{NTM}$ is the normalized impedance and $T_M$ is the normalization voltage and $Z_N$ is the standardized impedance value.

2. The apparatus of claim 1, wherein the permeability factor, μ, of the permeable core is between approximately 300 and 20,000.

3. The apparatus of claim 1, wherein the transmission winding generates the magnetic field using a signal having a frequency between 0.5 Hz and 100 Hz.

4. The apparatus of claim 2, wherein each of the one or more receivers comprises a coil configured to convert magnetic field signals to electrical signals.

5. The apparatus of claim 1, wherein the one or more casings comprise nested tubular casings.

6. The apparatus of claim 1, wherein the apparatus has an outside diameter of less than 2 inches.

7. A method for measuring material thickness of one or more casings comprising:

generating a magnetic field with a transmission winding having a permeable core disposed within the transmission winding and configured to boost the magnetic field;

detect changes in the magnetic field with one or more receivers and measure a standardized impedance value, at the one or more receivers, corresponding to the changes in the magnetic field;

measuring at a monitor winding disposed around the permeable core, a normalization voltage based at least in part on a strength of the magnetic field at the monitor winding, wherein the normalization voltage is configured to enable compensation for magnetic field distortion due to the permeable core; and determining a normalized impedance using the following equation:

$$Z_{NTM} = \frac{Z_N}{T_M}$$

where $Z_{NTM}$ is the normalized impedance and $T_M$ is the normalization voltage and Zn is the standardized impedance value.

* * * * *